(12) United States Patent
Thivierge et al.

(10) Patent No.: US 8,752,673 B2
(45) Date of Patent: Jun. 17, 2014

(54) LUBRICATION SYSTEM WITH POROUS ELEMENT

(75) Inventors: Patrick Thivierge, St-Basile-Le-Grand (CA); Mélanie Papillon, Carignan (CA); Pierre Gauvin, St-Bruno (CA); Patrick Arkinson, Chambly (CA); Robert Scandella, Iles Bizard (CA); Tom Haslam-Jones, Brossard (CA); Ritchie Domingo, Markham (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 627 days.

(21) Appl. No.: 12/548,761

(22) Filed: Aug. 27, 2009

(65) Prior Publication Data

US 2011/0048856 A1 Mar. 3, 2011

(51) Int. Cl.
*F01D 25/18* (2006.01)
*F16H 57/02* (2012.01)
*F16N 39/00* (2006.01)

(52) U.S. Cl.
USPC ............... 184/6.11; 184/6.21; 74/606 R (58) Field of Classification Search
USPC .............. 184/6.11, 6.17, 6.21; 74/606 R
See application file for complete search history.

(56) References Cited

U.S. PATENT DOCUMENTS

| | | | |
|---|---|---|---|
| 3,668,822 A | 6/1972 | Mannion et al. | |
| 3,960,239 A | 6/1976 | Frochaux et al. | |
| 4,149,860 A | 4/1979 | Kulik | |
| 4,330,306 A | 5/1982 | Salant | |
| 4,505,877 A | 3/1985 | Rion | |
| 4,787,921 A | 11/1988 | Shibata et al. | |
| 5,679,041 A * | 10/1997 | Sokol et al. | 442/59 |
| 6,432,178 B2 | 8/2002 | Lichon et al. | |
| 6,953,396 B2 | 10/2005 | Paschke et al. | |
| 7,048,230 B2 * | 5/2006 | Meyer | 244/130 |
| 7,182,869 B2 | 2/2007 | Catlin et al. | |
| 7,191,870 B2 | 3/2007 | Kimura et al. | |
| 7,364,604 B2 | 4/2008 | Wait | |
| 7,753,172 B2 * | 7/2010 | Munson | 184/6.11 |
| 2006/0248865 A1 | 11/2006 | Latulipe et al. | |
| 2008/0190700 A1 * | 8/2008 | Munson | 184/6.11 |
| 2009/0101444 A1 | 4/2009 | Alecu | |

FOREIGN PATENT DOCUMENTS

CA 2676831 10/2008

* cited by examiner

*Primary Examiner* — William E Dondero
*Assistant Examiner* — Robert T Reese
(74) *Attorney, Agent, or Firm* — Norton Rose Fulbright Canada LLP (57) ABSTRACT

A lubrication system for a gas turbine engine including at least one porous element located in a cavity containing at least one rotating component receiving a flow of the lubricant, the porous element being located across a path taken by a portion of the lubricant expelled from the at least one respective rotating component such that the portion of the lubricant circulates therethrough, the at least one porous element being made of a material resistant to a temperature of the lubricant, the at least one porous element reducing a velocity of the portion of the lubricant circulating therethrough.

18 Claims, 6 Drawing Sheets

LUBRICATION SYSTEM WITH POROUS ELEMENT

TECHNICAL FIELD

The application relates generally to lubrication systems providing lubricant to rotating components and, more particularly, to lubrication systems for gas turbine engines.

BACKGROUND

In a lubrication system of a gas turbine engine, the used lubricant expelled from the rotating components, such as the main bearings, meshed gears of the accessory gearbox and centrifugal air/oil separator, has an increased velocity and circulates along a swirling path, such that the used lubricant typically has a tendency to remain within the cavity containing the rotating component for a given period of time instead of circulating directly to the drains of the scavenge system. As such, the quantity of lubricant which remains in circulation within the lubrication system generally increases the weight of the engine and the size of the reservoir required to contain the lubricant when the engine is at rest. Accordingly, improvements are desirable.

SUMMARY

In one aspect, there is provided a lubrication system for a gas turbine engine, the lubrication system comprising a supply source containing a lubricant, at least one partial or complete enclosure each defining a cavity containing at least one respective rotating component receiving a flow of the lubricant, a pressure system including a supply fluid connection defined between the supply source and each cavity, the pressure system flowing the lubricant from the supply source to each rotating component, a scavenge system including a scavenge fluid connection defined between each cavity and the supply source, the scavenge system scavenging the lubricant from each cavity, and at least one porous element located in the at least one cavity across a path taken by a portion of the lubricant expelled from the at least one respective rotating component such that the portion of the lubricant circulates therethrough, the at least one porous element being made of a material resistant to a temperature of the lubricant, the at least one porous element reducing a velocity of the portion of the lubricant circulating therethrough.

In another aspect, there is provided a gearbox comprising a plurality of rotating meshed gears transferring power from a driving shaft to a driven shaft, a casing enclosing a gearbox cavity surrounding the meshed gears, a lubrication system including at least one supply fluid connection providing lubricant to the gearbox cavity and to the meshed gears and at least one scavenge fluid connection circulating the lubricant out of the gearbox cavity, and at least one porous element extending within the gearbox cavity across a path of a portion of the lubricant being projected by the rotating meshed gears, the at least one porous element reducing a kinetic energy of the lubricant circulating therethrough to facilitate direction of the lubricant toward the at least one scavenge fluid connection.

In a further aspect, there is provided a method of reducing a period of time necessary for lubricant to circulate from rotating components lubricated by a lubrication system back to a supply source of the lubricant, the method comprising reducing a kinetic energy of a portion of the lubricant expelled by at least one of the rotating components by circulating the portion of the lubricant through at least one element made of porous material, and redirecting the portion of the lubricant exiting the at least one element toward a connection with the supply source.

DESCRIPTION OF THE DRAWINGS

Reference is now made to the accompanying figures in which.

DETAILED DESCRIPTION

Figure 1:
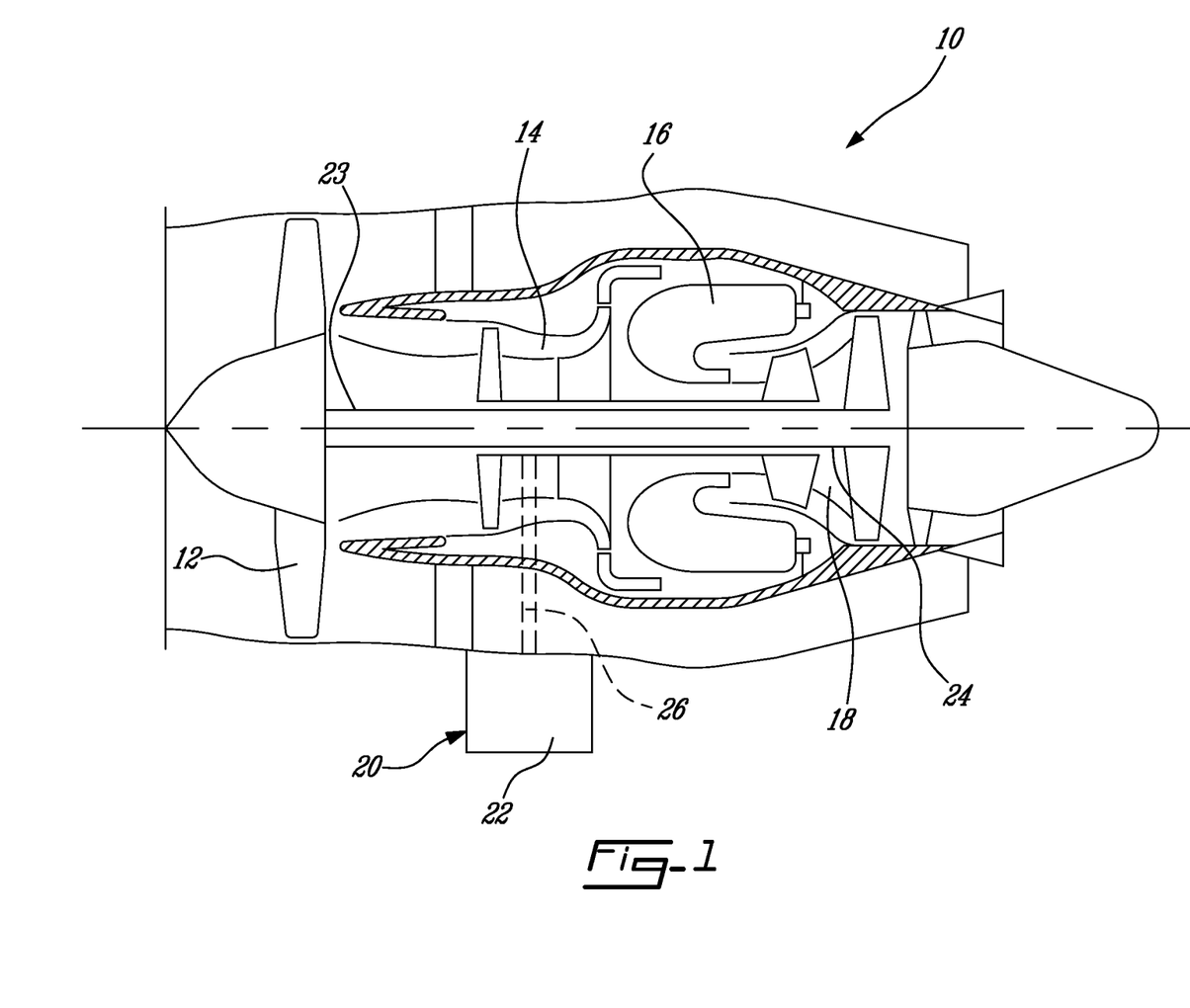
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12 is drivingly interconnected to low pressure rotor(s) of the turbine section 18 through a low pressure shaft 23, and the high pressure rotor(s) of the compressor section 14 is/are drivingly connected to high pressure rotor(s) of the turbine section 18 through a high pressure shaft 24 concentrically surrounding the low pressure shaft 23.

The gas turbine engine includes an accessory drive assembly 20 which includes an accessory gearbox (AGB) 22. Although not shown, the accessory drive assembly 20 can also include a pump assembly and/or a starter generator. The accessory drive assembly 20 is driven by the high pressure shaft 24 via an accessory shaft 26 which drivingly interconnects the high pressure shaft 24 and the accessory gearbox 22, for example through a first bevel gear (not shown) located at one end of the accessory shaft 26 and engaged with a corresponding bevel gear (not shown) of the high pressure shaft 24, and a second bevel gear 28 (see FIG. 3) located an opposed end of the accessory shaft 26 and engaged with a corresponding bevel gear 30 of the accessory gearbox 22.

Figure 2:
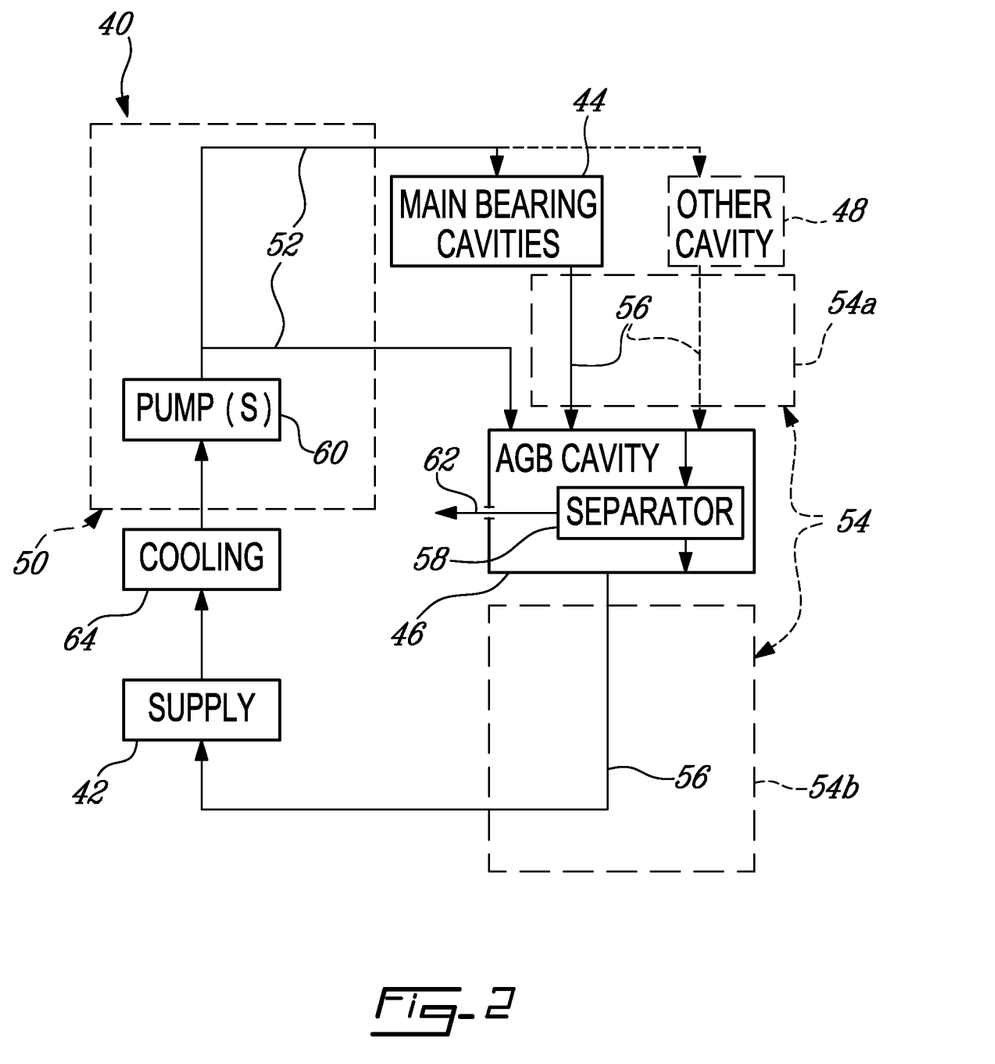
FIG. 2 is a diagram of a lubrication system which can be used in a gas turbine engine such as shown in FIG. 1.

Referring to FIG. 2, the gas turbine engine further includes a lubrication system 40 for lubricating and cooling rotating components of the engine 10, such as for example the main bearings supporting the low and high pressure shafts 23, 24 and the gears of the accessory gearbox 22. The lubrication system 40 includes a supply source 42 which is for example a reservoir, and at least partial or complete enclosure each defining a cavity containing at least one respective rotating component requiring lubrication. The cavities include a main bearing cavity 44 surrounding each of the main bearings, an accessory gearbox cavity 46 defined by the casing of the accessory gearbox 22, and optionally one or more cavities 48 each surrounding one of any other rotating component of the engine requiring lubrication.

The lubrication system 40 also includes a pressure system 50 including a supply fluid connection 52 defined between the supply source 42 and the cavities 44, 46, 48 to flow the lubricant to the rotating components, and a scavenge system 54 including a scavenge fluid connection 56 draining lubricant from the cavities 44, 46, 48 to scavenge the used lubricant from the rotating components back to the supply source 42, either directly or after circulation through an air/oil separator 58. In the embodiment shown, the air/oil separator 58 is located within the accessory gearbox cavity 46 and driven by a shaft thereof.

In use, the lubricant in the supply source 42 is directed by the pressure system 50 under pressure, for example with the help of one or more pumps 60, into the main bearing cavities 44 of the main shaft of the aircraft engine, the accessory gear box cavity 46, and any other cavity 48 requiring lubrication. The lubricant is circulated through the respective supply fluid connection 52 to be distributed to the rotating components.

During the lubrication of the main bearing cavities 44, the lubricant is mixed with relatively hot compressed air streams used to pressurize air seals of the main bearing cavities, resulting in a used lubricant in the form of an air/oil mixture. Such air seals can be labyrinth seals or other types of air seals. The use lubricant is also hot since the lubricant absorbs heat energy produced in the main bearing cavities as a result of the very high speed rotation of the main shaft of the aircraft engine, and further mixes with the relatively hot compressed air streams. In order to remove the air contained in the used lubricant, the used lubricant is circulated through the separator 58, which is for example a centrifugal separator.

A first portion 54a of the scavenge system 54 thus collects the used lubricant from the main bearing cavities 44 and other cavities 48 and flows it into the accessory gearbox cavity 46 through the respective scavenge fluid connection 56. Within the accessory gearbox cavity 46, the used lubricant reaches the inlet of the air/oil separator 58. Due to the centrifugal and coalescent effects within the separator 58, the liquid oil circulating therethrough is discharged to the accessory gearbox cavity 46, after which it accumulates at a lower portion of the cavity where a second portion 54b of the scavenge system 54 collects it and returns it to the supply source 42 through the corresponding scavenge fluid connection 56.

The first and second portions 54a,b of the scavenge system 54 circulate the lubricant with the help of pump(s) (not shown), gravity and/or blowdown.

The air contained in the used lubricant within the centrifugal separator 58 and under the pressure differential is discharged through a passage 62 to outside of the engine.

The lubricant discharged from the separator 58 is still relatively hot, and then becomes much cooler after the following scavenging process and by being mixed with the lubricant stored in the supply source 42. A cooling step is indicated at 64, which does not necessarily indicate a specific cooling device.

Figure 3:
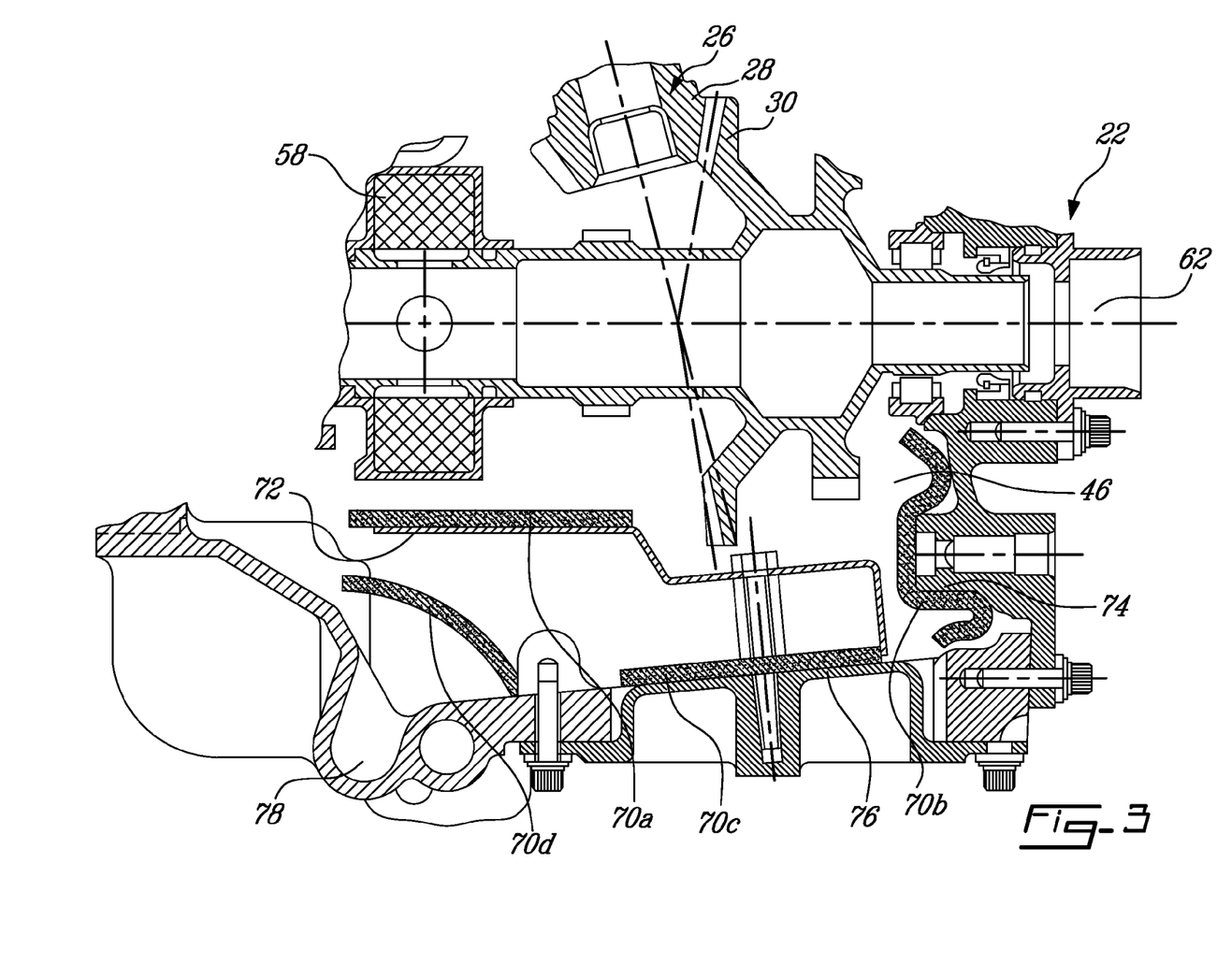
FIG. 3 is a schematic cross-section of a part of an accessory gearbox which can be used in a gas turbine engine such as shown in FIG. 1.

Referring to FIG. 3, an accessory gearbox cavity 46 according to a particular embodiment is shown, where a number of porous elements 70a,b,c,d are installed across a path of the used lubricant expelled from the separator 58 and/or meshed gears 28, 30 such as to reduce the velocity of the expelled lubricant. A first porous element 70a is shown, installed on a surface of a flange 72 positioned to receive the lubricant expelled from the centrifugal separator 58. A second porous element 70b is installed on a surface of a wall 74 of the casing defining the accessory gearbox cavity 46, upon which the lubricant deflected by the flange 72 and the lubricant expelled by the meshed gears 28, 30 is projected. A third porous element 70c is installed on a surface of a bottom wall 76 of the casing defining the accessory gearbox cavity 46, upon which the used lubricant is collected before flowing to a drain 78 communicating with the respective fluid connection 56 of the scavenge system 54 (see FIG. 2). A fourth porous element 70d is installed across a bottom of the accessory gearbox cavity 46 and over the drain 78 such that used lubricant flowing to the drain 78 flows through the fourth porous element 70d.

The porous elements 70a,b,c,d are placed on solid redirecting elements, e.g. casing wall, flange, etc., such that the used lubricant flow through the porous elements before reaching the redirecting elements, or alone across the cavity within the path of the used lubricant such that the used lubricant circulating across the cavity flows therethrough. The porous elements reduce the velocity of the lubricant circulating therethrough, thus "calming" the flow of lubricant and allowing the used lubricant to return to the scavenge system more quickly. Typically, walls, flanges or other solid redirecting surfaces attempt to redirect the flow toward the drain without substantially slowing it or reducing its energy, and as such an important quantity of the lubricant generally "bounces back" away from the intended redirection direction. By reducing the kinetic energy of the used lubricant, the porous elements reduce the quantity of used lubricant bouncing away from the intended redirection direction, such that the used lubricant is more quickly redirected toward the drain.

In a particular embodiment, only one of the porous elements 70a,b,c,d shown is provided, while in an alternate embodiment, the porous elements 70a,b,c,d are provided in any combination of two or more of the locations shown. Other locations are also possible, as long as the porous elements are located across the path of the used lubricant expelled from the rotating component(s) such that the used lubricant can circulate therethrough.

Figure 4:
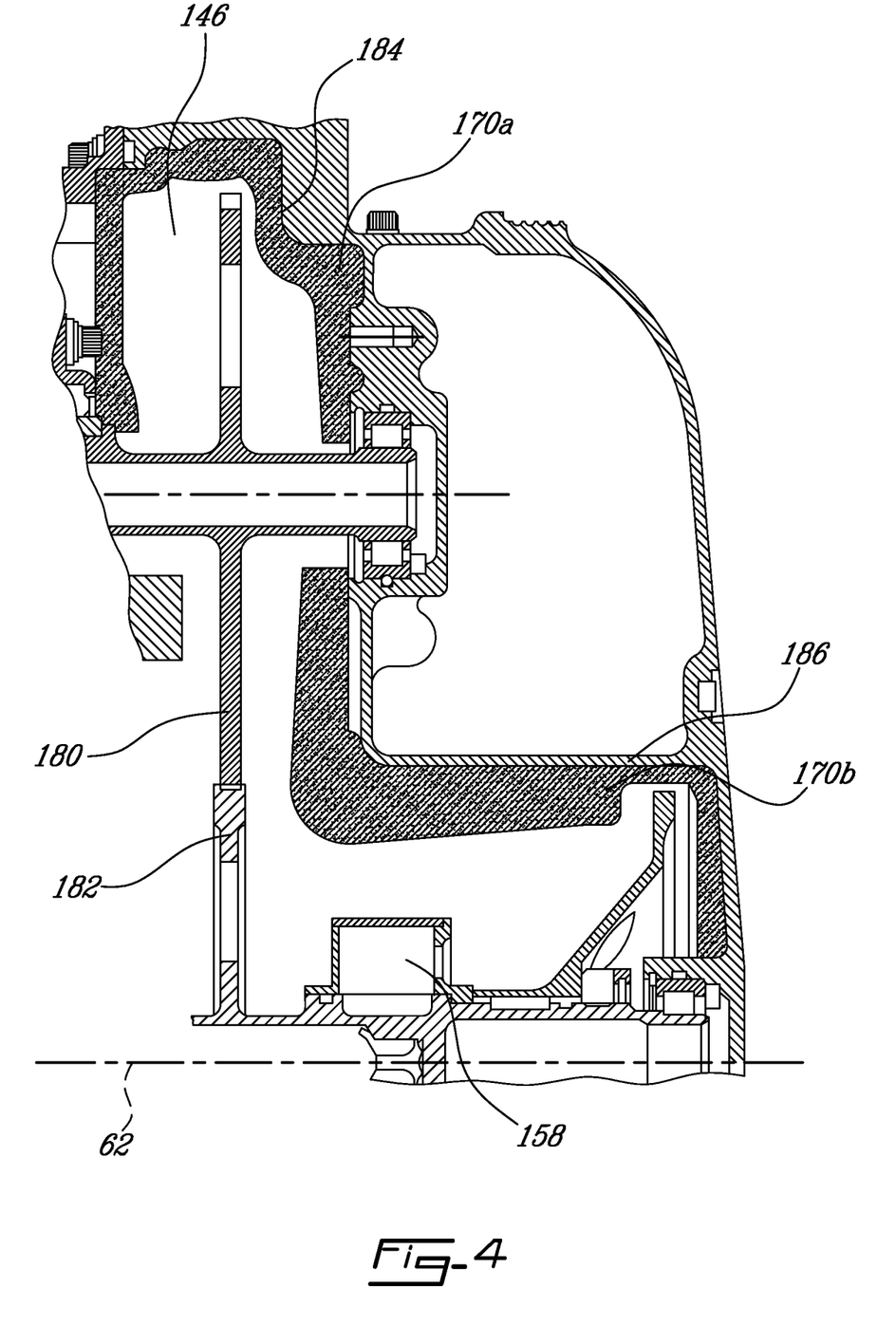
FIG. 4 is a schematic cross-section of part of an alternate accessory gearbox.

FIG. 4 shows a top portion of an accessory gearbox cavity 146 according to an alternate embodiment, where an air/oil separator 158 is provided on a shaft supporting a lower gear 182 which is meshed with an upper gear 180. The meshed gears 180, 182 are partially surrounded by two porous elements 170a,b. A first porous element 170a is provided along a top portion 184 of the casing wall defining the gearbox cavity 146. The first porous element 170a, like the wall portion 184 it is supported on, has a substantially inverted U-shape such as to surround a portion of the upper gear 180. A second porous element 170b is provided along a lower portion 186 of the casing wall, with the second porous element 170b and wall portion 186 having a substantially Z-shape. As such, the second porous element 170b extends in proximity of the meshed portions of the gears 180, 182 as well as along the wall receiving part of the used lubricant expelled from the separator 158. In a particular embodiment, only one of the two porous elements 170a,b is provided. In an alternate embodiment, any combination of two or more of the porous elements 70a,b,c,d 170a,b, previously described and/or of one or more porous elements in any other adequate location within the path of the used lubricant is provided.

Figure 5:
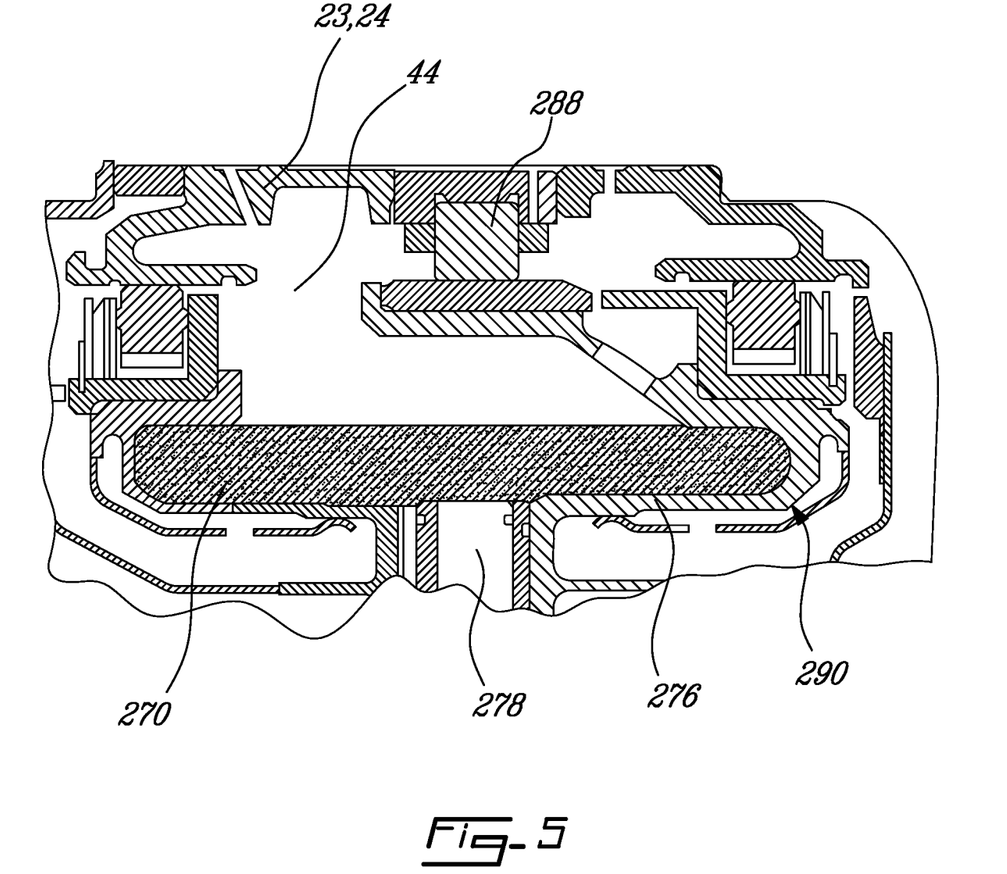
FIG. 5 is a schematic cross-section of a main bearing cavity of a gas turbine engine such as shown in FIG. 1.

Referring to FIG. 5, a main bearing cavity 44 according to an exemplary embodiment is shown. A bearing 288 supports one of the low pressure and high pressure shafts 23, 24, and is maintained in place by a housing 290. A drain 278 is defined at the bottom of the bearing cavity 44, which is in communication with the respective scavenge fluid connection 56 of the scavenge system 54 (see FIG. 2). A porous element 270 is provided along the bottom wall 276 of the bearing cavity 44 and across the drain 278, such that the used lubricant projected at the bottom of the cavity 44 circulates through the porous element 270.

Figure 6:
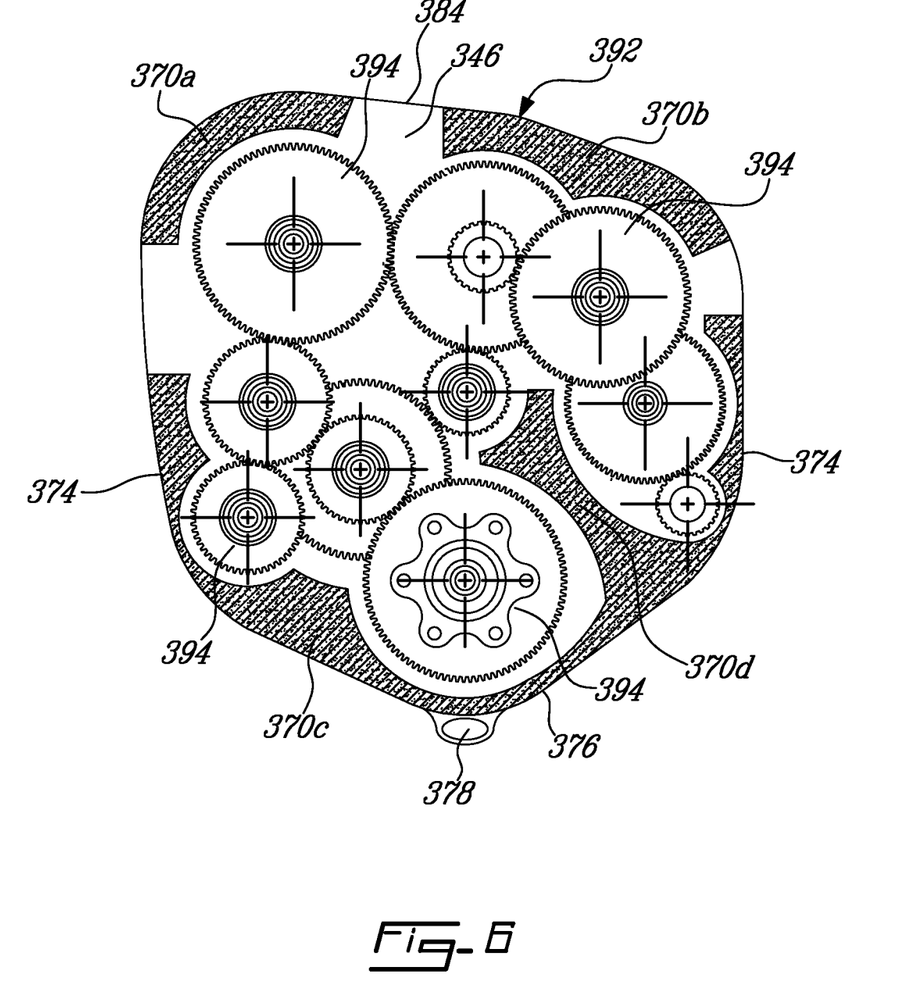
FIG. 6 is a schematic cross-section of a reduction gearbox which can be used in another type of gas turbine engine.

FIG. 6 shows an example of porous elements being applied to another type of gearbox, which in this case is a reduction gearbox 392 of a turboprop or turboshaft engine. The reduction gearbox 392 includes a plurality of meshed gears 394 contained within a gearbox cavity 346 defined by a casing surrounding the meshed gears, and a drain 378 is provided at the bottom of the cavity 346 in fluid connection with a corresponding scavenge system (not shown). A plurality of porous elements 370*a,b,c,d* are provided around the meshed gears 394 such as to receive the used lubricant expelled thereby. First and second porous elements 370*a,b* extend along upper walls 384 of the casing and in proximity of adjacent ones of the gears 394. A third porous element 370*c* has a substantially U-shape and extends along side and bottom walls 374, 376 of the casing and across the drain 378 such that the used lubricant flows through the third porous element 370*c* before reaching the scavenge system. The third porous element 370*c* is preferably shaped to follow the contour of adjacent ones of the gears 394, such as to receive a maximum of the used lubricant expelled therefrom. A fourth porous element 370*d* extends from the third porous element 370*c* and can be integral therewith, and extends between adjacent spaced apart ones of the gears 394. As such, all of the gears 394 are partially surrounded by at least one of the porous elements 370*a,b,c,d*. As above, the porous elements 370*a,b,c,d* can be provided in any one or any combination of two or more of the shown locations, or in any other locations where the used lubricant expelled from the meshed gears can circulate therethrough.

The porous elements 70*a,b,c,d*, 170*a,b*, 270, 370*a,b,c,d* are made of a mesh or open cell foam material adapted to resist to the high temperature of the lubricant circulating therethrough, which in a particular embodiment is about 300° F. Such a material can include, for example, silicon carbide, reticulated vitreous carbon (RVC), or any adequate type of ceramic or metal or combinations thereof. Preferably, the porous elements 70*a,b,c,d*, 170*a,b*, 270, 370*a,b,c,d* are made of aluminium mesh.

In a particular embodiment, the density of the porous elements 70*a,b,c,d*, 170*a,b*, 270, 370*a,b,c,d* is between 10 and 40 pores/inch inclusively, or between 6 and 8%.

The porous elements 70*a,b,c,d*, 170*a,b*, 270, 370*a,b,c,d* also acts to separate some of the air from the lubricant, thus increasing the effectiveness of the air/oil separation process within the lubrication system.

In a particular embodiment, several porous elements 70*a,b,c,d*, 170*a,b*, 270, 370*a,b,c,d* having different densities are provided within the lubrication system, or within the same cavity, with the porous elements receiving lubricant including a higher proportion of air therein having a greater density than that of the porous elements receiving lubricant having a lower proportion of air therein. Also, in a particular embodiment, the porous elements receiving lubricant having a higher velocity have a greater density than that of the porous element receiving lubricant having a lower velocity. For example, a porous element located at the top of the gearbox cavity, where the used lubricant includes more air therein and a higher velocity, can have a higher density than a porous element located at the bottom of the gearbox cavity where the lubricant contains a lower proportion of air and has a lower velocity. In a particular embodiment, porous elements of three different densities are provided within the lubrication system, or within the same cavity, with densities of for example 10, 20 and 40 pores/inch, and are distributed according to the proportion of air contained in the lubricant and/or the speed of the lubricant circulating in the portion of the lubrication system where each porous element is provided, as set forth above.

The porous elements, in reducing the velocity and calming the lubricant circulating therethrough, advantageously reduce the time taken by the used lubricant to exit the cavity and reach the scavenge system. In addition, the porous elements alone or in combination with a baffle or wall upon which the porous elements are provided help redirect the used lubricant toward the drain(s) leading to the lubrication system, thus further reducing the time taken by the used lubricant to reach the scavenge system. As such, the quantity of lubricant in circulation at a given time of operation of the lubrication system is reduced. This, in turn, reduces the total quantity of lubricant required, and as such the necessary size for the supply source (e.g. reservoir) and the overall weight of the engine.

Also, when the volume of the cavity surrounding the rotating components is sized below a given minimum, the lubricant generally remains "caught" within the cavity due to its turbulence and due to the airflow produced by the rotating components, and as such is prevented from dropping to the bottom of the cavity and be redirected to the scavenge system. The presence of the porous element, in reducing the turbulence of the used lubricant and the effect of the airflow produced by the rotating components on the lubricant, allows for the cavity containing the rotating components to have a smaller volume while still allowing the lubricant to return to the bottom of the cavity. As such, in a particular embodiment, the presence of the porous elements allow for the cavities containing each rotating component to have a smaller size, thus potentially reducing the overall weight of the engine.

The porous elements can advantageously be added to new as well as existing lubrication systems.

The above description is meant to be exemplary only, and one skilled in the art will recognize that changes may be made to the embodiments described without departing from the scope of the invention disclosed. For example, the porous element can also be similarly incorporated in high performance gearboxes other than those included in aircraft gas turbine engines, for example in the types of high performance gearboxes usable in cars, trains and/or boats. Still other modifications which fall within the scope of the present invention will be apparent to those skilled in the art, in light of a review of this disclosure, and such modifications are intended to fall within the appended claims.

The invention claimed is:

1. A lubrication system for a gas turbine engine, the lubrication system comprising:
  a supply source containing a lubricant;
  at least one partial or complete enclosure including a housing defining therewithin a cavity containing at least one respective rotating component receiving a flow of the lubricant;
  a pressure system including a supply fluid connection defined between the supply source and each cavity, the pressure system flowing the lubricant from the supply source to each rotating component;
  a scavenge system including a scavenge fluid connection defined between each cavity and the supply source, the scavenge system scavenging the lubricant from each cavity; and
  at least one porous element located in the cavity, the porous element extending across a path taken by a portion of the lubricant expelled from the at least one respective rotating component such that the portion of the lubricant circulates therethrough, with at least one of the at least one porous element spanning across a drain of the cavity in communication with the scavenge fluid connection so as to receive the expelled lubricant thereon, each porous element being made of a material resistant to a temperature of the lubricant and reducing a velocity of the portion of the lubricant circulating therethrough.

2. The lubrication system as defined in claim 1, wherein the at least one enclosure includes a casing of an accessory gearbox, the at least one respective rotating component including meshed gears and/or an air/oil separator driven by a shaft of the accessory gearbox.

3. The lubrication system as defined in claim 1, wherein the at least one enclosure includes a bearing cavity, and the at least one rotating component includes a bearing.

4. The lubrication system as defined in claim 1, wherein the at least one porous element is provided over a surface of a baffle extending within the cavity and/or on a surface of a wall defining the enclosure and/or directly on, and substantially covering, another solid redirecting surface of the housing.

5. The lubrication system as defined in claim 1, wherein the at least one porous element includes at least first and second porous elements with a density of the first porous element being higher than that of the second porous element, the first porous element receiving lubricant having a higher proportion of air therein and/or a higher velocity than that received by the second porous element.

6. The lubrication system as defined in claim 1, wherein the at least one porous element includes a mesh material and/or an open cell foam.

7. The lubrication system as defined in claim 1, wherein the material is resistant to a temperature of at least 300° F.

8. The lubrication system as defined in claim 1, wherein the material includes aluminium.

9. The lubrication system as defined in claim 1, wherein the at least one porous element has a density of at least 10 pores/inch and at most 40 pores/inch.

10. The lubrication system as defined in claim 1, wherein the at least one porous element has a density from about 6% to about 8%.

11. The lubrication system as defined in claim 1, wherein the housing and the at least one porous element are rotationally stationary.

12. The lubrication system as defined in claim 1, wherein the at least one porous element is located in the cavity without substantially filling the cavity.

13. A gearbox comprising:
a plurality of rotating meshed gears transferring power from a driving shaft to a driven shaft;
a casing enclosing a gearbox cavity surrounding the meshed gears;
a lubrication system including at least one supply fluid connection providing lubricant to the gearbox cavity and to the meshed gears and at least one scavenge fluid connection circulating the lubricant out of the gearbox cavity; and
at least one porous element extending within the gearbox cavity, the porous element extending across a path of a portion of the lubricant being projected by the rotating meshed gears, with at least one of the at least one porous element spanning across a drain of the gearbox cavity in communication with the at least one scavenge fluid connection so as to receive the lubricant projected by the rotating meshed gears, the at least one porous element reducing a kinetic energy of the lubricant circulating therethrough to facilitate direction of the lubricant toward the at least one scavenge fluid connection.

14. The gearbox as defined in claim 13, wherein the at least one porous element is provided over a surface of a baffle extending within the gearbox cavity and/or on a surface of an inner wall of the casing and/or directly on, and substantially covering, a solid redirecting surface of the casing and/or across the gearbox cavity in between adjacent but spaced apart ones of the gears.

15. The gearbox as defined in claim 13, wherein the at least one porous element includes at least first and second porous elements with a density of the first porous element being higher than that of the second porous element, the first porous element receiving lubricant having a higher proportion of air therein and/or flowing faster than that received by the second porous element.

16. The gearbox as defined in claim 13, wherein the at least one porous element includes a mesh material and/or an open cell foam.

17. The gearbox as defined in claim 13, wherein the at least one porous element is made of a material resisting a temperature of at least 300° F.

18. The gearbox as defined in claim 13, wherein the at least one porous element has a density of at least 10 pores/inch and at most 40 pores/inch.

* * * * *